United States Patent [19]

Taulman

[11] Patent Number: 4,469,018
[45] Date of Patent: Sep. 4, 1984

[54] ENERGY-SAVING CLOSURE FOR FOUNDATION VENTS

[76] Inventor: Noel W. Taulman, 5023 S. 33rd W. Ave., Tulsa, Okla. 74107

[21] Appl. No.: 350,408

[22] Filed: Feb. 19, 1982

[51] Int. Cl.³ .............................................. F24F 7/00
[52] U.S. Cl. ........................................ 98/37; 98/29; 98/114; 52/302
[58] Field of Search .............. 52/202, 204, 476, 479, 52/199, 169.5, 302; 98/36, 37, 43 C, 44, 29, 32, 114; 49/62

[56] References Cited

U.S. PATENT DOCUMENTS

| | | | |
|---|---|---|---|
| 2,793,721 | 5/1957 | Sterud | 52/204 |
| 2,821,895 | 2/1958 | Allabaugh | 98/37 |
| 2,834,278 | 5/1958 | Crute | 98/37 |
| 2,889,900 | 6/1959 | Singleton | 49/62 |
| 2,905,072 | 9/1959 | Oswald | 98/37 |
| 2,995,079 | 8/1961 | La Fontaine | 98/37 |
| 3,001,332 | 9/1961 | Wilder | 98/31 |
| 3,115,082 | 12/1963 | Sanoff | 98/37 |
| 3,130,659 | 4/1964 | Compton | 98/37 |
| 3,388,520 | 6/1968 | Perry | 52/202 |
| 3,753,323 | 8/1973 | Nesbitt | 52/DIG. 3 |
| 3,882,218 | 5/1975 | Bixer | 52/DIG. 3 |
| 4,026,082 | 5/1977 | Crofoot | 52/302 |
| 4,270,311 | 6/1981 | Palomar | 49/465 |
| 4,325,229 | 4/1982 | DeZurik | 98/114 |

Primary Examiner—John E. Murtagh
Attorney, Agent, or Firm—George L. Rushton

[57] ABSTRACT

To cover a foundation vent opening in a building having applied siding, a rectangular piece of siding is sized to fit the opening, insulation is attached to the rear or inside of the siding piece, and mounting flanges are used to secure the closure in the opening.

2 Claims, 4 Drawing Figures

Fig. 7
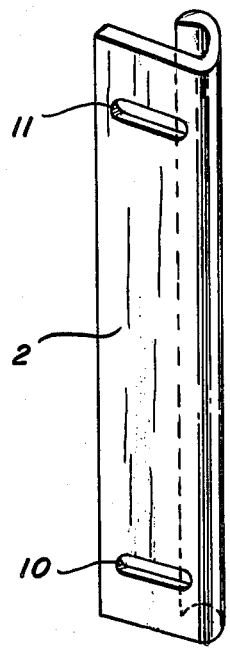
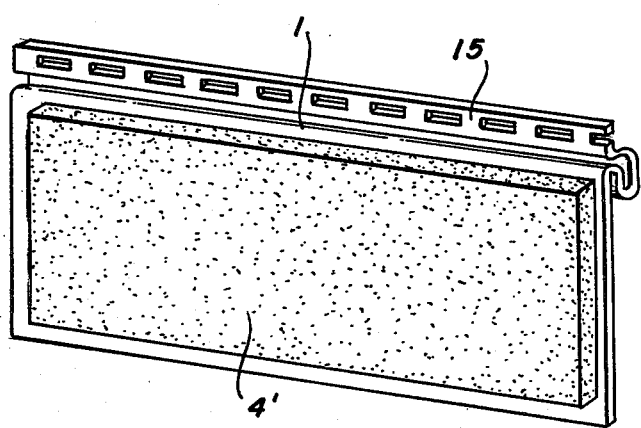
Fig. 8

ENERGY-SAVING CLOSURE FOR FOUNDATION VENTS

BACKGROUND OF THE INVENTION

This invention concerns the saving of energy. More particularly, the invention concerns the saving of energy as related to buildings such as residences and small office and commercial buildings. The invention is used where air circulation vents are placed in foundations of such buildings. The invention, in various embodiments, concerns a removable vent cover or vent insert, used to restrict or eliminate the movement of cold air in space between the floor of a residence and the ground below the floor. This space is typically referred to as "crawl space".

The invention is particularly applicable to a residence, such as a wood frame house, in which additional siding, such as plastic, metal, or coated metal, has been applied to the outside walls of the residence.

As is usual in such cases, these air circulation vents are left open or uncovered during that portion of the year when the air temperature is warm enough to require little or no heating in the residence. During cold weather, cold air circulating under the floor of the residence results in cold floors inside the residence. Then, additional heat energy is used to maintain a desirable temperature in the residence. If the circulation vents are closed, such as by a vent cover or vent insert, the generally quiescent air between the floor and the ground becomes warmer, thus raising the temperature of the floors inside the residence and so reducing the heating load.

SUMMARY OF THE INVENTION

The invention is a portable apparatus for closing or covering a vent opening in a residential, commercial, or industrial building clad with a plurality of elongated sheathing elements defining siding and including said vent opening, the closing device comprising:
(a) a generally rectangular segment of siding matching the existing siding,
(b) a layer of insulation covering one face of said segment,
(c) a mounting flange fixed to one margin of said segment,
(d) a pair of opposed adjustable mounting flanges connected to second and third margins of said segment, and
(e) locking tabs rotatably mounted on said opposed margins, for securing said siding segment in place.

A primary object of this invention is to provide a means of conserving energy in buildings having foundation vents.

Another object is to provide vent closing devices that are architecturally and visually compatible with the siding.

A further object is to reduce the cost of said closures by fabricating them from the same, or similar, material used for the siding.

Another object is to prepare vent closing devices that are properly fitted to conserve energy and are also easily insertable and removable.

BRIEF DESCRIPTION OF THE DRAWINGS

FIG. 7 is a perspective view of one of the adjustable mounting flanges used on the closure.

FIG. 8 is a perspective view of the rear, or inside, of one embodiment of the closure, showing the insulation attached to the closure.

DETAILED DESCRIPTION OF THE INVENTION

In describing the embodiments of this invention, it should be understood that any specific terms used include all equivalents which operate in a manner to accomplish a single purpose.

Figure 1:
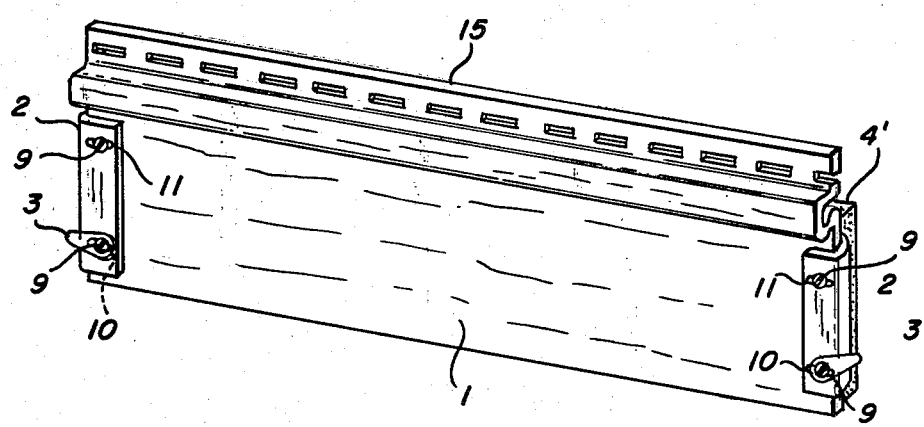
FIG. 1 is a perspective view of one embodiment of the vent closing device, hereinafter the closure.
Figure 3:
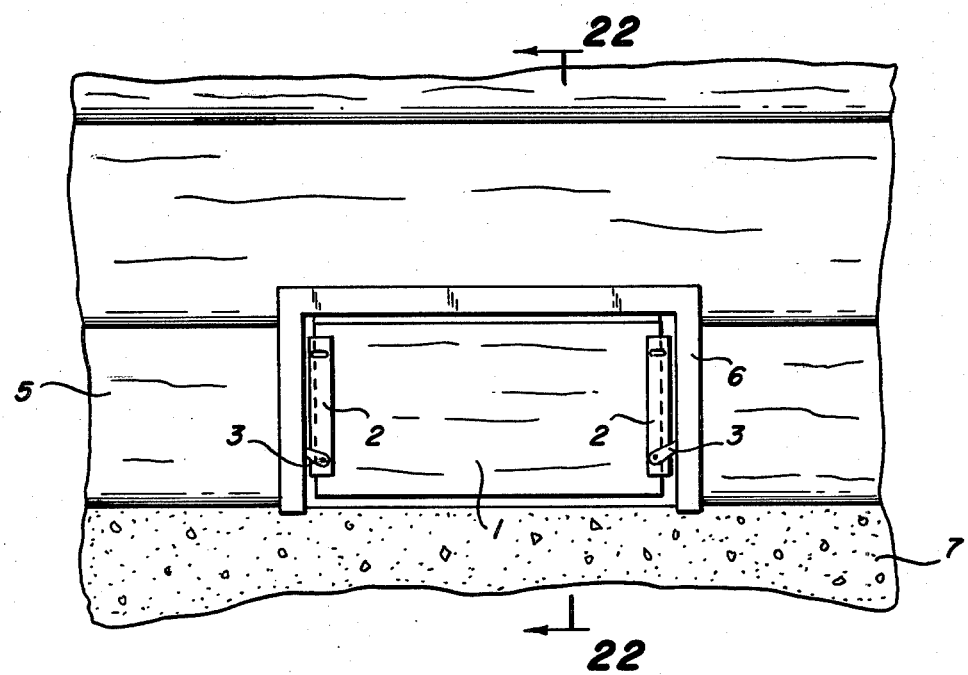
FIG. 3 is an elevation view of one embodiment of the invention, showing a portion of a siding-covered wall and a foundation of a house, with the vent closure installed. 22—22 is a cross-section view later detailed in FIG. 4.
Figure 4:
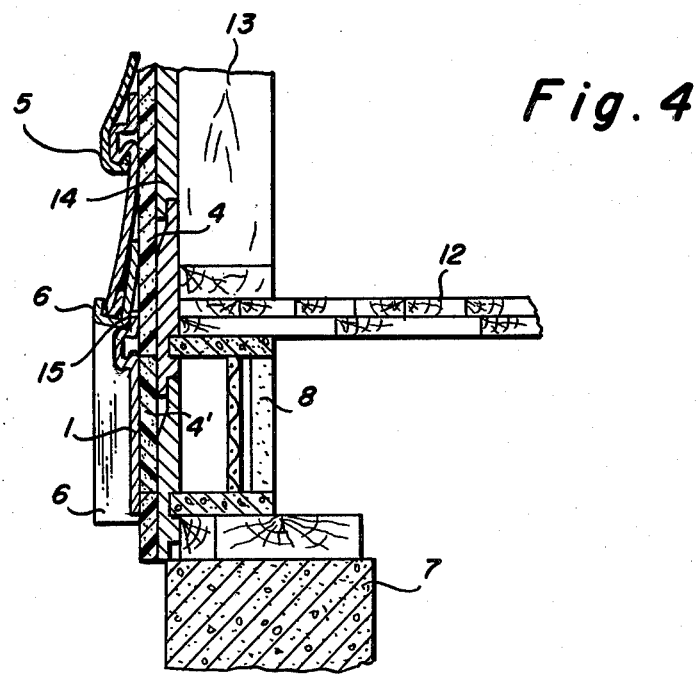
FIG. 4 is a cross-section view of line 22—22 of FIG. 3, illustrating the relationship of the wall, the floor, the foundation, the vent, the wall siding, and the vent closure, as one embodiment of the invention.

Referring to the drawings, in which the same number is used in various figures to portray the same part, piece, or portion, FIG. 1 shows a perspective view of an exemplary vent closure 1 having adjustable mounting flanges 2. Each flange 2 has a lower elongated slot 10 and an upper elongated slot 11, so that flange 2 can be adjustably mounted on and attached to closure 1 by attaching means 9, such as a metal screw. Also used with flange 2 is locking tab 3, used to secure closure 1 into the framing of vent 6 (FIG. 3). The upper portion of closure 1 is designated as mounting flange 15, this portion denoting the non-flat section of a typical piece of siding used for closure 1. Flange 15 is used for positioning and holding the upper portion of closure 1 in the upper portion of vent frame 6. The lower portion of a piece of siding, said lower portion denoted by 5 in FIG. 4, is removed when the siding is used as a closure 1. Insulation 4' is applied to the face of closure 1 that is oriented toward the interior of the building.

Figure 2:
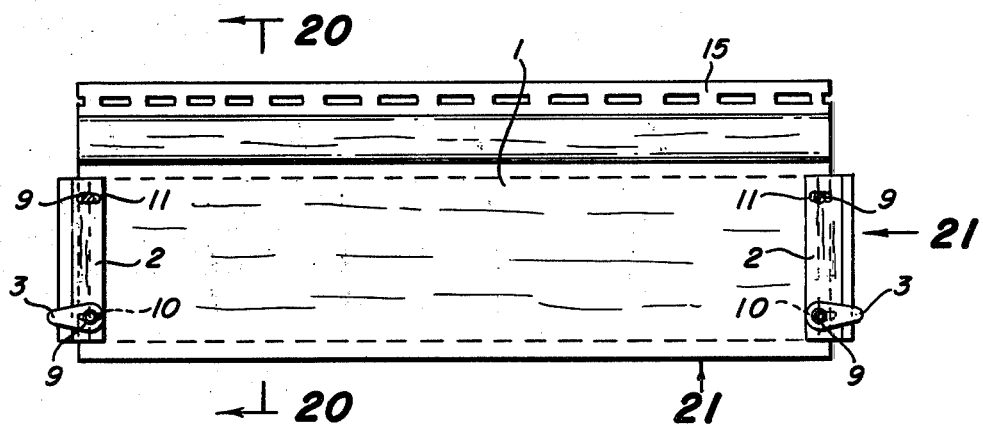
FIG. 2 is a front elevation view of one embodiment of the closure. 20—20 indicates a cross-section view later detailed in FIG. 5. 21—21 indicates a tangential front elevation view later detailed in FIG. 6.

FIG. 2 is a front elevation view of the closure described in FIG. 1.

FIG. 3 is a front elevation view of closure 1 installed in a vent opening. This embodiment illustrates how adjustable flanges 2 can be moved so that flange 2 forms a snug fit between closure 1 and vent frame 6. Also shown is locking tab 3, used to secure closure 1 in vent frame 6. The figure also shows the construction details of building foundation 7 and house siding 5. A transverse section of FIG. 3 along the line 22—22 is shown in FIG. 4.

FIG. 4 shows the relation of the structure or building, such as a residence, the vent, the siding, and the vent closure. The wall framing 13 of the building, the inside floor 12 of the building, the original building siding 14, foundation 7 and foundation vent 8 comprise the original or basic structure. Insulation 4, such as foamed polystyrene, is attached to the outside of original siding 14, with a portion of insulation 4 removed so as not to form a permanent cover over the opening of foundation vent 8, as outlined by vent frame 6 (FIG. 3). Insulation 4', which can be the same or can differ from insulation 4, is applied to the inside face of closure 1. Flange 15, insulation 4', and adjustable flanges 2 comprise the vent closure 1. The cross-section view of siding 5, vent frame 6, and flange 15 show how these pieces relate when vent closure 1 is easily inserted into and removed from vent frame 6.

Figure 5:
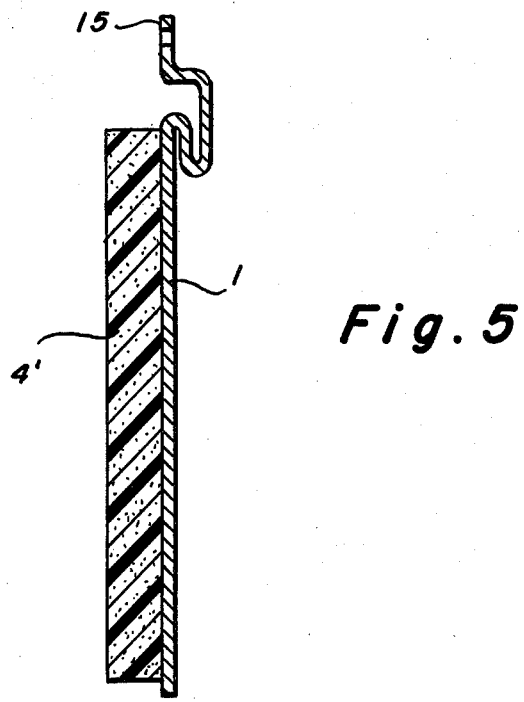
FIG. 5 is a cross-section view of one embodiment of the closure with attached insulation, detailing line 20—20 of FIG. 2.

FIG. 5 is a cross-section view of vent closure 1, noted in the line 20—20 of FIG. 2. This figure shows how insulation 4' and flange 15 form a portion of closure 1. Since it is an object of the invention to fabricate the vent closure from the same, or similar, material as used for siding for the rest of the structure, pieces of scrap siding can be used for the vent closure 1. A typical piece of scrap siding has an upper non-flat flange portion (15 of FIG. 4) and a lower non-flat portion (5 of FIG. 4) in addition to the major flat portion (1 of FIG. 5). When used as a closure 1, the scrap siding has the lower non-flat portion 5 removed, resulting in the cross-section shown in FIG. 5 (wherein insulation 4 is attached to show the completed insulated insert).

Figure 6:
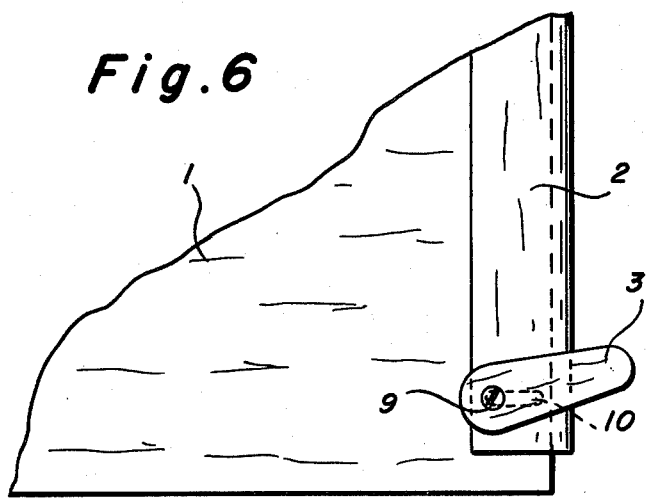
FIG. 6 is an enlarged detail view of tangential line 21—21 of FIG. 2, showing a locking tab used on the closure.

FIG. 6, a front elevation view of the portion of FIG. 2 noted by the tangential line 21—21 shows an enlarged detail view of a corner of closure 1, adjustable flange 2, locking tab 3, attaching means 9, and lower elongated slot 10. A similar arrangement, with or without locking tab 3, can be used at the upper corner of closure 1, to insure a snug fit.

FIG. 7 is a perspective view of adjustable flange 2. As in the case of closure 1, flange 2 can be fabricated from excess scrap siding material, such as the lower non-flat portion 5 of FIG. 4.

FIG. 8 is a rear perspective view of vent closure 1, with insulation 4' attached. FIG. 8 is related to FIG. 5, a cross-section view of vent closure 1.

Since foundation vents typically are not of a standard size, vent closures can vary in dimensions. Broadly, the vents can vary in height from about 4 inches to about 10 inches, while the width can vary from about 8 inches to about 16 inches. In one embodiment, a vent closure can be about 8"×14", for insertion into the framing of a foundation vent. As mentioned before, the vent closure is easily and inexpensively fabricated from scrap siding and insulation used on the basic building.

The siding used for covering the outside walls of the structure can be selected from the various types of siding available and used for this purpose. Some examples of siding are plastic, aluminum, steel, and plastic-coated metal. The coatings and colors used on the siding can vary and are not a part of the invention. The method of attaching insulation to the siding of the vent closure can be any of those well known in construction. Similarly, the locking tab can be chosen from these known in the art. The adjustable flanges can be, for example, about $1\frac{1}{2}$ inches by $5\frac{1}{2}$ inches, sufficient to form a desirable fit when the vent closure is inserted in the vent frame.

I claim:

1. In a residential, commercial, or industrial building of the type clad with a plurality of elongated sheathing elements defining siding and including air vent openings in said siding, a portable device for closing said openings comprising:
   (a) a generally rectangular segment of siding matching the existing siding,
   (b) a layer of insulation covering one side of said siding segment,
   (c) a mounting flange fixed to one margin of said segment,
   (d) a pair of opposed adjustable mounting flanges connected to second and third margins of said segment, and
   (e) locking tabs rotatably mounted on said opposed margins for securing said siding segment in place.

2. The closing devise of claim 1, wherein:
   (a) the rectangular segment of siding can be sized to fit vent openings varying in width from about 8 to about 16 inches in height from about 4 to about 10 inches,
   (b) the siding material is selected from the group consisting of plastic, aluminum, steel, and plastic-coated metal, and
   (c) the rectangular segment of siding, the opposed adjustable mounting flanges, and the insulation used for the device can be fabricated from like material used for the existing siding on the building.

* * * * *